(12) United States Patent  (10) Patent No.: US 8,192,162 B2
Loftus et al.  (45) Date of Patent: Jun. 5, 2012

(54) FIELD INSTALLABLE AND REMOVABLE HELICOPTER ROTOR BLADE VIBRATION AND BLADE TRACKING DEVICE

(76) Inventors: Robert T. Loftus, Gilbert, AZ (US); Michael J. McNulty, Scottsdale, AZ (US)

( * ) Notice: Subject to any disclaimer, the term of this patent is extended or adjusted under 35 U.S.C. 154(b) by 919 days.

(21) Appl. No.: 12/181,822

(22) Filed: Jul. 29, 2008

(65) Prior Publication Data

US 2010/0028151 A1 Feb. 4, 2010

(51) Int. Cl.
*F01D 5/02* (2006.01)

(52) U.S. Cl. ....... 416/62; 416/144; 416/145; 416/241 A; 416/500

(58) Field of Classification Search ....... 416/23, 416/24, 62, 144, 145, 228, 237, 241 A, 500; 244/17.11, 17.13, 17.27
See application file for complete search history.

(56) References Cited

U.S. PATENT DOCUMENTS

| 2,430,948 | A | | 11/1947 | Platt |
| 3,018,832 | A | | 1/1962 | Prewitt |
| 3,237,697 | A | | 3/1966 | Ford et al. |
| 3,830,109 | A | | 8/1974 | Litvinovich et al. |
| 3,952,601 | A | * | 4/1976 | Galli et al. ........................ 73/455 |
| 4,526,641 | A | * | 7/1985 | Schriever et al. ............. 156/247 |
| 4,789,305 | A | * | 12/1988 | Vaughen ........................ 416/131 |
| 5,239,468 | A | | 8/1993 | Sewersky et al. |
| 5,273,398 | A | | 12/1993 | Reinfelder et al. |
| 5,711,651 | A | * | 1/1998 | Charles et al. .................. 416/24 |
| 6,196,066 | B1 | * | 3/2001 | Barbier ........................... 73/456 |
| 6,311,924 | B1 | | 11/2001 | Ferrer |
| 6,558,809 | B1 | * | 5/2003 | Kelch et al. .................. 428/520 |
| 7,097,427 | B2 | | 8/2006 | Kuhns et al. |
| 7,118,343 | B2 | * | 10/2006 | Loftus et al. .................. 416/145 |
| 2008/0159870 | A1 | * | 7/2008 | Hong ............................ 416/224 |

OTHER PUBLICATIONS

Prc-DeSoto International, Technical Data, PR-1535 Potting and molding compound, Feb. 1999.*

* cited by examiner

*Primary Examiner* — Angel Roman
(74) *Attorney, Agent, or Firm* — The von Hellens Law Firm, Ltd.

(57) ABSTRACT

This invention provides convenient airframe vibration and tracking improvements of a helicopter rotor blade by use of an elastomer profile system that is attached through an adhesive system that allows convenient removal and relocation for use by the helicopter manufacturer or by the helicopter operator in a field environment.

21 Claims, 3 Drawing Sheets

FIELD INSTALLABLE AND REMOVABLE HELICOPTER ROTOR BLADE VIBRATION AND BLADE TRACKING DEVICE

CROSS REFERENCE TO RELATED APPLICATIONS

Not Applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed to helicopter rotor vibration reduction; in particular to the placement of removable self-adhering elastomer ramp profiles upon the trailing edge of the rotor blades for the purpose of reducing dynamic vibration. It is also directed to improving rotor blade track characteristics, that is, the out-of-plane displacement of the blade tips to ensure that they all spin in the same rotational plane.

(2) Description of Related Art

Others have attempted to control the dynamic vibrations of rotor blades through the attachment of weights and trim tabs on the blades. For example, U.S. Pat. Nos. 2,430,948, 3,237,697, and 4,789,305 all show the use of weights or trim tabs that are added to the blades. Weights may be relocated to a new position on the rotor based on test measurements to reduce vibration. Trim tabs may be bent to alter the aerodynamic pitching moment at specific location on the rotor blade to improve rotor track and to reduce vibration.

Others have used dynamic balancing of the rotors either in a laboratory setting or in an actual flight test. For example, U.S. Pat. No. 7,097,427 discloses the use of a whirl test stand or the use of the helicopter and U.S. Pat. No. 2,430,948 discloses the use of a laboratory test on a spindle or upon the aircraft itself. U.S. Pat. No. 5,239,468 describes an automated in-flight helicopter maintenance monitoring system for collecting airframe and component maintenance data along with rotor balance and tracking data. However, without a rapid method to make a quick adjustment to the rotor blade, changes to alter rotor vibration and improve rotor track characteristics still require significant time and the use of specialized equipment.

Others have tried various bolt-on style weight mechanisms to correct blade induced airframe vibrations. For example, U.S. Pat. No. 5,273,398 is a washer weight system that is attached through a stud and locking nut. This system is less attractive as it requires significant disassembly and is positioned at only one location on the blade. It is less adjustable as it does not provide for a more continuous adjustment by the use of many weights over the length of the blade.

Others have permanently bonded ramp tabs to the blades based on an initial vibration test. For example, U.S. Pat. No. 3,952,601 describes a method of balancing blades initially and then permanently bonding the ramp tabs to the blade. This method has important practical difficulties. Once installed, the ramp tabs are difficult to remove since the permanent epoxy adhesive used to install these ramp tabs has significant strength which requires the use of tools to ply or scrape the tab off the surface of the blade. As a result, the removal of the ramp tab after bonding requires the destructive removal of the tabs or paint on the blade surface. Consequently, whenever there is a vibration change in the blade over the service life, tab removal damages the blade. The epoxy adhesive requires a significant level of effort to be used in any removal method. In most cases, the rotor blade needs to be removed from the helicopter to provide proper access to perform the removal, adhesive cleanup, and repair of the blade surface. This degree of repair adds significant risk of damage to the structure of the blade substrate. Reinstallation of the ramp tabs in a field environment with the use of permanent epoxy adhesive is also not practical. The process of rotor vibration smoothing and track adjustment is often iterative. The method of adhesive application and curing associated with epoxy bonding of ramp tabs is not advantageous to the timely completion of the rotor smoothing process.

Additionally, the method described in U.S. Pat. No. 3,952,601 is a whirling stand method that compares the rotor blade to a master blade rather than an in flight measurement. It is not a practical iterative field method and only results in the blade being adjusted to match the master blade at a limited operational condition that does not include translational velocities of the helicopter.

A permanently bonded ramp tab is not desirable due to changes that occur over the service life of a rotor blade. The changes include wear, moisture absorption, and blade shape changes that all helicopter rotor blades experience over their useful lives. These changes can degrade tracking and vibration characteristic of the rotor and cause vibration changes in the airframe.

Also, it has been found that the use of a whirling stand method for rotor smoothing as described in U.S. Pat. No. 3,952,601 is not optimum for achieving both blade tracking and airframe vibration corrections over the full flight speed range in actual use. What works well at one particular speed may need to be optimized at a range of speeds. Stationary whirl stands can only replicate the rotor operating conditions of vertical thrust and rotational speed, but not forward flight speed. Achieving satisfactory rotor vibration levels for any translational flight speed is not possible with the use of only a stationary whirling stand method. As a result, additional adjustments are required to achieve acceptable blade tracking and airframe vibration over the full flight speed range in actual use.

The inability to make field changes has made permanently bonded ramp tabs impractical in actual use as a primary method for periodic blade tracking and vibration reduction. As a result, permanently bonded ramp tabs are not widely used in the helicopter industry.

Currently, field adjustments to helicopter rotor tracking and vibration are performed by a trim tab method for the majority of all helicopter models and manufacturers. The trim tab method consists of a narrow metal flat panel that is permanently bonded to the helicopter rotor blade and overhangs the trailing edge. It is bent upward or downward by using a special tool, typically at an angular change of 1 to 10 degrees based on field vibration measurements. The trim tab is the current state of the art for field adjustments to correct rotor tracking and vibration and is practical for use in a field environment. Unfortunately, this method is imprecise and normally requires numerous iterations to achieve the desire result. Repeatability of the angular change is often difficult since the magnitude of the required angle change of the trim tab is often very small. Another shortcoming of the trim tab method is that the metal tab itself will move over time, resulting in degradation to rotor track and vibration. Also, trim tab positions will move as a result of blade flexing during flight. The result of this phenomenon is the necessity to re-adjust the angular position of the trim tabs on a frequent basis to maintain low vibration levels.

BRIEF SUMMARY OF THE INVENTION

It is an object of this invention to provide a convenient method of reducing vibration created by a helicopter main rotor blades or tail rotor blades by use of an attached elastomer profile system through an adhesive system that allows convenient installation and removal. It is a primary object of this invention to provide an improved method of adjustment by comparatively uncomplicated methods in a field environment. Additionally, it is a main goal of the present invention to provide for simultaneous improvement of both vibration and blade tracking over the helicopters full speed range.

BRIEF DESCRIPTION OF THE SEVERAL VIEWS OF THE DRAWING(S)

DETAILED DESCRIPTION OF THE INVENTION

Figure 1:
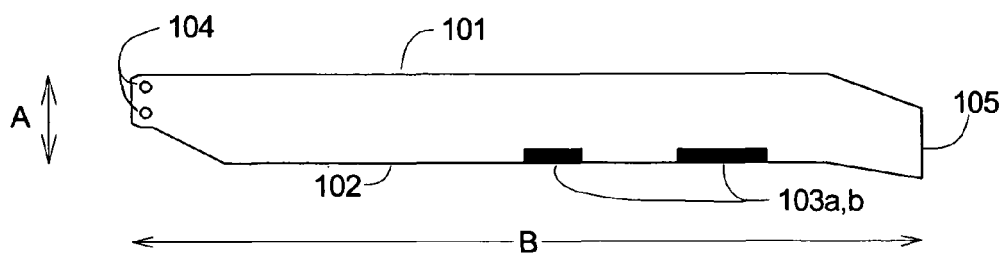
FIG. 1 shows a preferred embodiment of a helicopter blade utilizing a plurality of removable attached elastomer profiles.

An important object of the present invention is to overcome the deficiencies of the previous attempts of others, and provide for both air-frame vibration improvements due to rotor-induced vibration simultaneously with improvements in blade tracking. The improvements are provided by utilizing elastomer profiles that are installable and removable in the field based on actual in-flight measurements. Additionally, the elastomer profiles are also usable in test rigs or shop measurements to provide initial rotor adjustment.

Another important object of the present invention is to provide for field adjustments over the service life of a helicopter rotor blade where the elastomer profile may be conveniently removed and installed in the field without the need for the rotor blades to be removed from the helicopter.

Another important object of the present invention is to provide for field adjustments over the service life of a helicopter rotor blade where adjustments to the rotor may be conveniently done with greater precision and repeatability than present methods. The elastomer profile of the present invention provides for a precisely known geometric addition to a rotor compared with the current state of the art.

The preferred embodiment of this invention is a device of specific geometry, composed of an elastomeric material and affixed to the trailing edge of the rotor blade for the purpose of providing a small aerodynamic change to the blade. The selection of an elastomer as the optimum material for this device is driven by three primary considerations. First, the lower material stiffness of an elastomer significantly reduces the demand on the adhesive used to secure the profile to the surface of the rotor blade. This is important due to the cyclic fatigue strain environment that is present at the trailing edge location of all helicopter rotor blades during operation. Since the cross-section of the elastomer profile is small in area, the device must strain at the same magnitude as the rotor blade surface to which is attached. If it does not strain at the same rate, the device will separate at the adhesive interface, become detached, and fall off. The shear strain in the adhesive that attaches the profile device to the rotor blade surface is directly proportional to the material stiffness of the profile device. The selection of a relatively soft elastomer for the construction of the profile device allows the use of a pressure sensitive adhesive (PSA) system. If the profile was to be fabricated from a stiffer material (higher modulus of elasticity) such as rigid plastics, fiber reinforced composite material or metal, the demand on the adhesive system would be proportionally higher. Pressure sensitive adhesive systems that allow for a peel removal of the profile by hand would not have sufficient strength to retain a profile with high material stiffness. A profile composed from rigid plastics, fiber reinforced composite material, or metal would require a higher strength adhesive like epoxy to stay attached to the surface of the rotor blade during operation. The use of a permanent epoxy adhesive would make the use of the profile device impractical for field installation and removal.

The second consideration for the use of low stiffness elastomer for the construction of the profile device is to facilitate removal. The low stiffness of the material allows the profile to be flexed at a very abrupt location. This capability provides a mechanical advantage when removing the device in a peeling action, much like peeling a piece of tape from a flat surface. During a peeling action, the adhesive is caused to fail along a single discrete linear zone directly adjacent to the abrupt flex of the profile. Rigid materials would be more difficult to separate due to their inability to peel by local flexing of the material. A profile composed of higher stiffness materials would require a greater force to fail the adhesive over a broader area during removal of the device. This force would be too great for a simple hand removal process and would require the use of a tool for greater mechanical advantage.

The third consideration for the use of low stiffness elastomer for the construction of the profile device is to facilitate length adjustment. The low durometer elastomer profile can be shortened to the desired length prior to installation by means of cutting with standard hand scissors or by knife cut. A profile device composed of stiffer and stronger materials such as rigid plastics, fiber reinforced composite material or metal would require greater effort to alter the length of the profile. Such means would require the use of a hand saw or powered cutting device.

The acceptable range for material stiffness, or durometer, for the elastomer of the profile device is 10 to 100 on the Shore A scale. In a preferred embodiment of this invention, the material of choice is EPDM (ethylene propylene diene monomer) elastomer with a durometer range of 50-70 Shore A. This specific type of elastomer was selected for a good combination of material properties. Of greatest importance is EPDM's exceptional environmental resistance to degradation when exposed to extreme heat, cold, sun light and chemicals. A secondary consideration for this material selection is the ability of EPDM to provide good adhesion with a variety of adhesive types, including preferred type of pressure sensitive adhesive.

As an object of the present invention, it is desired to determine the amount of necessary adhesion that will allow a segment length of elastomer profile to provide satisfactory adhesion for serviceable life in the severe conditions seen by a helicopter rotor blade over a wide range of flight and environmental conditions, and yet still be removable without damage to either the blade or the elastomer profile. To this end, testing was performed to determine the relative magnitude of adhesion of the elastomer profiles bonded to rotor surfaces. It is desirable to compare this level of adhesion to that of permanently bonded elastomer profiles where destructive removal is necessary.

A laboratory measurement was setup where EPDM (ethylene propylene diene monomer rubber) elastomer strips were bonded to simulated helicopter rotor blade surfaces with two different types of adhesive which included a pressure sensitive acrylic adhesive as well as an permanent bonding epoxy paste adhesive. The load required to peel the EPDM strips from the different rotor surfaces were measured and recorded. The failure mode for each strip was also observed and recorded.

EPDM strips were bonded to rigid substrate panels for peel tests. Three different substrate surfaces were used during this particular experiment. These surfaces included painted aluminum, bare aluminum, and glass fiber reinforced epoxy composite laminate. The type of paint used on the painted aluminum was an aviation grade paint conforming to MIL-DTL-64159. This paint is a catalyzed epoxy based material representative of the paint that is typically used on the exterior surfaces of helicopter rotor blades. The composite laminate used for this test had an epoxy resin that was pre-cured at 260 degrees F. The surface of the composite laminate was not painted for this experiment.

The EPDM strips used for this experiment were composed of 70 durometer EPDM conforming to ASTMD2000. Each EPDM strip was 10 inches long, 1.25 inches wide and had an average thickness of 0.065 inches.

Two different adhesives were tested during this experiment. The first adhesive was a pressure sensitive adhesive (PSA) manufactured by 3M, designated as VHB. The second adhesive used in this experiment was a two-part epoxy paste adhesive. This material is designated as EA9309.3 and was manufactured by Henkel/Hysol. This material was mixed and cured at room temperature per the manufacturers instructions. The adhesive was allowed to cure for a minimum of 72 hours prior to the execution of the peel testing.

Three elastomer strips were bonded to each of the three substrate panel surfaces (nine elastomer strips total). For each panel, two elastomer strips were bonded with the epoxy paste adhesive and one elastomer strip was bonded with the pressure sensitive adhesive for each substrate surface. The surfaces of the elastomer strips that were bonded with the epoxy paste adhesive were prepared for bonding with a light scuff abrasion with 3M Scotchbrite (red) and solvent wipe with isopropyl alcohol. The surfaces of the elastomer strips that were bonded with the PSA were prepared for bonding with a proprietary process. The surfaces of the three different substrate panels were all prepared for bonding with a light scuff abrasion with 3M Scotchbrite (red) and a solvent wipe with isopropyl alcohol. The alcohol was allowed to evaporate. All surfaces were prepared for bonding immediately prior to the application of the adhesive. All of the elastomer strips were bonded with approximately one-inch extension of each strip beyond the edge of the substrate panels. The purpose for this extension was to allow for attachment of the load-measuring device during the peel test procedure.

Each strip of elastomer was pulled from the substrates until failure was achieved. The strips were pulled one at a time. During each pull operation, the load required to sustain a peeling action was measured. A hand held mechanical load indicator was used to determine the peel force for each test coupon. The full-scale range of the load indicator was 25 lbs force. The load indicator was attached to the end of each elastomer strip by a metal hook. A small hole was punched through the end of each elastomer strip where they extended beyond the end of the substrate panels. A metal hook attachment on the end of the load indicator was inserted into the hole in the elastomer prior to each pull test. Load was applied at a right angle to the surface of the substrate until peel failure of the adhesive was initiated. The application of force was maintained in order to produces continuous peel propagation along the full length of the elastomer strip. The direction of the force was maintained perpendicular to the substrate panel surface during peel propagation along the length of the strip. Force was applied to maintain a peel propagation rate of approximately one inch per second. The load required to sustain continuous peel propagation was recorded for each elastomer strip. The failure mode for each elastomer strip and associated adhesive bond was also recorded.

Table 1 summarizes the load measurements for each elastomer peel test. The failure modes differed for the two types of adhesive but were similar for all three substrate surfaces.

The elastomer strips that were bonded with the PSA peeled cleanly from the substrate panel surfaces. All of the PSA remained on the elastomer after the peel failure. This result was consistent for all three substrate surfaces. No damage was caused to the paint or substrates by the peeling of the elastomer strips that were bonded with the PSA. The surfaces were unaffected by the application and subsequent removal of the elastomer/PSA.

A very different peel failure mode was observed for the sample bonded with the epoxy paste adhesive. All elastomer strips that were bonded with the epoxy paste adhesive, regardless of the substrate surface, had virtually all (>95%) of the epoxy paste adhesive remain on the substrate surfaces after the peel failure. In addition, some of the epoxy samples exhibited partial failure of the elastomer where rubber remained on the surface of the epoxy paste adhesive.

TABLE 1

| Substrate No. | Adhesive | Peel Load Range - lbs (lb/in) | Avg. Peel Load - lbs (lb/in) | Failure Mode | Comment |
|---|---|---|---|---|---|
| 1 | AA | 3.5-5.0 (2.8-4.0) | 4.3 (3.4) | PSA to paint | 100% adhesive stayed on EPDM. No adhesive on substrate. |
| 1 | BB | 9.5-10.0 (7.6-8.0) | 9.8 (7.8) | Adhesive to EPDM | Most adhesive remained on painted substrate. <5% adhesive stayed on EPDM. |
| 1 | BB | 10.0-14.0 (8.0-11.2) | 12 (9.6) | Adhesive to EPDM | Most adhesive remained on painted substrate. <5% adhesive stayed on EPDM. |
| 2 | AA | 5.0-5.5 (4.0-4.4) | 5.3 (4.2) | PSA to Aluminum | 100% adhesive stayed on EPDM. No adhesive on substrate. |
| 2 | BB | 18.0-20.0 (14.4-16.0) | 19 (15.2) | Mixed: within | Load indicator hook pulled out of EPDM within initial ⅜ inch of |

TABLE 1-continued

| Substrate No. | Adhesive | Peel Load Range - lbs (lb/in) | Avg. Peel Load - lbs (lb/in) | Failure Mode | Comment |
|---|---|---|---|---|---|
| | | | | EPDM and adhesive to EPDM | peel test. Approx 60% EPDM failure, 40% adhesive to EPDM |
| 2 | BB | 19.0-22.0 (15.2-17.6) | 20.5 (16.4) | Mixed: within EPDM and adhesive to EPDM | Load indicator hook pulled out of EPDM within initial ¼ inch of peel test. Approx 80% EPDM failure, 20% adhesive to EPDM. |
| 3 | AA | 3.5-5.5 (2.8-4.4) | 4.5 (3.6) | PSA to laminate | 100% adhesive stayed on EPDM. No adhesive on substrate. |
| 3 | BB | 9.0-12.0 (7.2-9.6) | 10.5 (8.4) | Adhesive to EPDM | Most adhesive remained on composite substrate. <5% adhesive stayed on EPDM |
| 3 | BB | 16.0-21.0 (12.8-16.8) | 18.5 (14.8) | Mixed: within EPDM and adhesive to EPDM | Adhesive remained on composite substrate. Approx 10% of surface was EPDM failure. <5% adhesive stayed on EPDM. |

Notes:
No. 1 - Painted Aluminum Substrate
No. 2 - Bare Aluminum Substrate
No. 3 - Glass/Epoxy laminate (unpainted) Substrate
Type AA - 3M VHB PSA Adhesive Type
Type BB - EA9309.3 epoxy Adhesive Type The failure mode and peel strength for the elastomer (EPDM) strips that were bonded with the PSA were consistent regardless of the surface material composition of the substrate panel. The removal left no residual PSA on the substrate surface following the peel test. All PSA remained attached to the elastomer strips after peel. This result is due to greater adhesion peel strength of the PSA to the prepared elastomer than to the substrate surface. The magnitude of peel strength for the elastomer strips bonded with PSA was significantly lower than the coupons bonded with the epoxy adhesive. The variation of the peel load was also very minimal for the three PSA samples regardless of the surface material composition of the substrate. The average peel load for the PSA samples was 3.7 lbs/inch. The range for the three samples was 3.4 lbs/inch for the painted surface to 4.2 lbs/inch for the bare aluminum surface.

The failure mode and peel strength of the elastomer strips that were bonded with the epoxy adhesive were much less consistent than the samples bonded with the PSA. For all of the epoxy samples, the majority of the epoxy remained on the substrate surface following the peel test. The magnitude of peel strength for the elastomer strips bonded with the epoxy adhesive was higher than the coupons bonded with the PSA but the variation of the peel load was much less consistent for the epoxy samples. The average peel load was 12.0 lbs/inch for all six elastomer strips bonded with epoxy adhesive. The epoxy sample with the lowest average peel strength was 7.8 lbs/inch for one of the strips bonded to the painted surface. The epoxy sample with the highest average peel strength was 16.4 lbs/inch for one of the strips bonded to the bare aluminum surface. The two epoxy peel test samples could not be pulled over the entire length of the elastomer strip because the hook on the end of the load indicator tore out of the hole in the elastomer. Both of these samples exhibited a majority of the peel failure in the elastomer instead of an adhesive failure of the epoxy. This high degree of variation in peel strength and failure mode for the strips bonded with epoxy adhesive may be attributed to variation in the surface preparation process of the elastomer prior to bonding. It was observed that the use of 3M Scotchbrite to roughen the surface of the elastomer prior to bonding was difficult to perform in a consistent manner. This was due to the softness of the elastomer.

In conclusion, the samples bonded with PSA were more consistent in peel strength and failure mode than those bonded with epoxy adhesive. The magnitude of the peel strength for the elastomer strips bonded with PSA was significantly lower than those bonded with epoxy adhesive. The most important observation of this test effort was that the PSA remained adhered to the elastomer where the majority of the epoxy remained adhered to the substrate surface following peel of the elastomer strips. These are significant and critical distinctions when assessing these two adhesives for the installation of elastomer on helicopter rotor blades. For applications that are intended to be permanent where an elastomer profile is never intended to be removed for the useful life of the rotor blade, an epoxy adhesive like the one used for this test investigation would be an appropriate choice. For applications such as in-service vibration and track maintenance, where a profile needs to be removable without damage over the useful life of a rotor blade, a PSA like the one used for this test investigation would be an appropriate choice.

The conclusion of the experimentation determined that an epoxy adhesive is unacceptable in the case where in field installation and removal are desired. Initially, for profile installation, an epoxy adhesive would require a significant and unacceptable amount of time to install. This is due to significant cure times for epoxy adhesive systems. Once cured, the epoxy adhesive forms a very strong bond between the elastomer material of the profile and the rotor blade surface. The removal of an elastomer profile bonded with epoxy adhesive would require a significant level of effort. The results of the experimentation revealed that when an elastomer profile, bonded with epoxy adhesive, is pulled from the surface of the rotor blade, a significant amount of adhesive and elastomer residue will remain of the surface of the blade. A peel load of 15 lb/inch or more will result in tearing of the elastomer profile where all of the adhesive and much of the elastomer will remain on the surface of the rotor blade following a peel operation. In most cases, the rotor blade would need to be removed from the helicopter to provide the access and tools needed to perform the removal, adhesive cleanup, and repair of the blade surface. This degree of effort adds significant risk of damage to the structure of the blade substrate when attempting to remove residual epoxy adhesive from the surface of the rotor blade.

A pressure sensitive adhesive (PSA), for the purposes of this invention, should be understood to mean an adhesive that forms a bond when pressure is applied to marry the adhesive with the adherent. No solvent, water, heat, or cure time is needed to activate the adhesive. PSAs are capable of holding adherents together when the surfaces are mated under briefly applied pressure. Based on the testing, the demonstrated adhesion range for the PSA adhesive used for this experiment was shown to be between 2.8 and 4.4 lb per inch-width peel strength. These values did not present any difficulty with removal of the EPDM strips by hand force. Based on engineering assessment as well as measurements from certified helicopter flight test mechanics, the maximum acceptable peel load could be at least 50% greater (6.6 lb per inch) without creating significant difficulty of removing an elastomer profile by use of hand force only or the risk of causing damage to the blade structure. An upper peel force of 6.6 lb per inch is well below the level of 14.4 lbs per inch that was demonstrated to cause failure of the elastomer material during removal. The peel strength range of 2.8 to 6.6 lb per inch provides suitable bonding for retention of the elastomer profile on a rotating blade but not too great to hinder the peel removal by hand after installation (i.e. removal without tools). It is also desirable for the adhesive to be lifted off with the elastomer profile when the profile is peeled from the rotor blade surface without having significant adhesive residue remaining on the rotor blade surface after removal. This characteristic also facilitates rapid removal of the elastomer profile without the need to clean off residual adhesive from the blade surface.

FIG. 1 shows a preferred embodiment of a helicopter blade utilizing a plurality of PSA attached elastomer profiles. A leading edge 101 of the helicopter blade rotor and a trailing edge 102 are shown. Inboard attachment lugs 104 and the outboard rotor blade tip end 105 are shown. Elastomer profile shapes 103a,b preferably in the shape of elongated wedges, completely contained within the geometry of the helicopter blade rotor are attached to the exterior surface of the rotor blade. Each of the elastomer profiles 103a,b has suitable adhesion to ensure that it remains in place during the service life of the rotor blade and can withstand the shear forces due to centrifugal force of rotation and peel forces from aerodynamic impingement during flight. The blade chord dimension A extends between the leading edge and trailing edge. The span dimension B is measured in the direction from the center of the rotor radially outward to the tip of the rotor as shown. In a preferred embodiment, the PSA adhering elastomer profiles are installed on the trailing edge of the helicopter blade with respect to the motion of the blade through the air. The elastomer profile can be installed on either the upper or lower side of the rotor blade trailing edge.

Figure 2B:
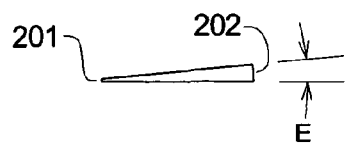
FIGS. 2A-2B show a preferred embodiment of an isometric view of an elastomer profile.
Figure 2A:
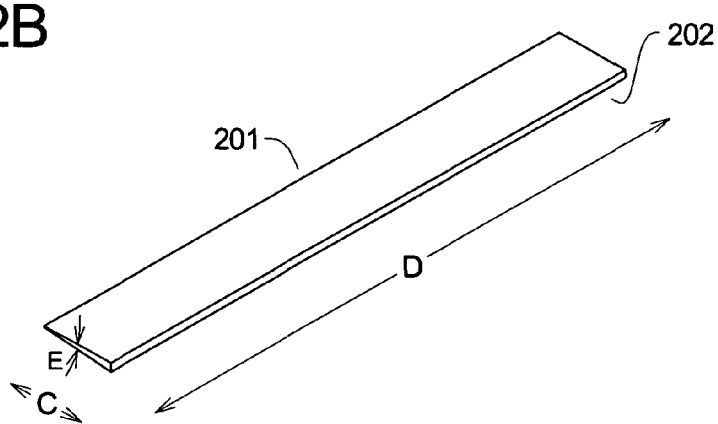

FIGS. 2A-2B shows a detail of a preferred embodiment of the elastomer profile. FIG. 2B is a magnified end view of the elastomer profile showing that it is substantially a wedge or near triangular in cross section. In FIG. 2A, it is seen that the shape of the elastomer profile is an elongated wedge, that is, a 2D wedge shape that extends in a third dimension. The elastomer profile preferably has a thin leading edge 201 thickness ranging from zero up to 0.050 inch. In the preferred embodiment, the thickness of the leading edge is limited to a range 0.005 to 0.010 inches thick based on practical manufacturing issues and aerodynamic drag considerations. The leading edge may be rounded or shear cut. The elastomer profile has a ramp angle E of less than or equal to 20 degrees and a trailing edge 202. In the preferred embodiment shown, the ramp angle E will range from 3 to 12 degrees. Strictly speaking, the sides of the ramp angle do not have to be perfectly straight. One or both sides may incorporate a minor curvature. In this case the ramp angle is measured based on a straight line fit of the curve. The elongated wedge chord dimension C is based on the rotor chord dimension and is less than or equal to 20% of the rotor chord dimension. In a preferred embodiment, the dimension C will range from 2 to 10% of the rotor chord dimension. The span-wise placement (along with upper or lower side placement) of a segment length D of the elastomer profile on the surface of the rotor blade will vary depending upon the specific vibration and track corrections needed.

In the preferred embodiment, the elastomer profile is supplied as an assembly with the PSA applied to one side of the profile. The PSA is then protected from contamination by use of a removable barrier membrane. Prior to installation, the barrier membrane is removed to expose the PSA surface. The elastomer profile/PSA assembly is then installed on the surface of the rotor blade at the appropriate location.

The effect that a short segment of elastomer profile has on the aerodynamics of a rotating rotor blade is similar to the effects of a bending adjustment made to a conventional trim tab deflected to half the profile's ramp angle. Both devices cause a local change to the aerodynamic pitching moment at the location of change. Although small, these changes can correct differences within a rotating set of blades resulting in lower vibration and a better rotor track condition. The benefit of providing adjustment at a variety of span-wise locations along rotor blade is that rotor vibration and tracking can be optimized throughout a range of forward speed of the helicopter. As the helicopter flies faster, the span-wise regions of the blades that provide the greatest contribution to lift will vary whether the blade is advancing in the direction of flight or retreating. As a result, adjustments must be made at varying span-wise location along the blade in order to reduce vibration and improve tracking throughout the range of airspeeds that the helicopter can fly. The shortcoming of conventional metal trim tabs is that they are often limited in span-wise length and location, depending on the intended purpose or mission of any model helicopter. This often limits the range of speed at which vibration can be optimized. The benefit of the PSA adhering elastomer profile is that it can be applied at any span-wise location with any desired angle or span-wise length. This benefit allows for a greater degree of adjustment to vibration and track through a wider range of airspeed without the necessity to modify the basic design or construction of the rotor blade itself.

The effect that a single segment of elastomer profile has on the aerodynamics of a given rotating rotor blade is dependent on the width C, the angle E and the length D of the elastomer profile in addition to its placement on the rotor blade in a span-wise direction. Tailoring the effect of a single segment of elastomer profile can be accomplished by varying any one or a combination of these parameters. The elastomer profile could be supplied to the operator in a continuous length D at a specific width C, and at a limited number of specific angle E configurations for a specific rotor application. Fine adjustment could be made by the use of different angle E profiles of a specific length or by varying the length D for a fixed angle profile or a combination of both. In a preferred embodiment, the PSA adhering elastomer profile would be supplied with a constant width C and angle E. Adjustability would be accomplished by varying the span dimension D for each profile application. The span dimension D is not limited to a specific length and in an extreme case may be as long as the span of the helicopter rotor blade. However, very short span dimensions are commonly used. The elastomer profile is located on the top of the rotor blade, the bottom, or both, depending upon how the vibration or blade tracking needs to be improved. A simple cutting operation of the elastomer span dimension D, and its location on the rotor blade may be all that is needed to provide a very fine and optimum correction to a airframe vibration imbalance or rotor track condition. Additionally, the location and length of the elastomer profiles are not limited by structural or aerodynamic constraints to provide for blade vibration reduction and rotor tracking correction.

In actual use, the PSA adhering elastomer profile is aligned on the trailing edge of the helicopter rotor blade as already illustrated in FIG. 1. The trailing edge 202 of the elastomer profile and the trailing edge of the helicopter rotor are substantially aligned in the preferred embodiment.

Both the main lifting rotor blade and the tail rotor blade can be adjusted by the methods of this invention.

With the utilization of this invention, the rotor blade is initially statically mass balanced to within acceptable tolerances or receives an initial satisfactory balance on a ground-based test stand. Airframe vibration and rotor track measurements are then measured in an actual flight situation. The vibration measurement is preferably done by an in-flight measuring system by use of accelerometers or with vibration sensors as is known in the art. The amount of, and the location of, the corrective PSA adhering elastomer profile is then added (or removed) and new magnitude of airframe vibration is again determined during flight. If unacceptable vibrations or rotor track are still experienced, corrections can again be made by the addition or removal of PSA adhering elastomer profiles. The in-flight testing continues by iterative measurements and as needed corrective changes are made until the vibrations and rotor track are within desired parameters.

Figure 3:
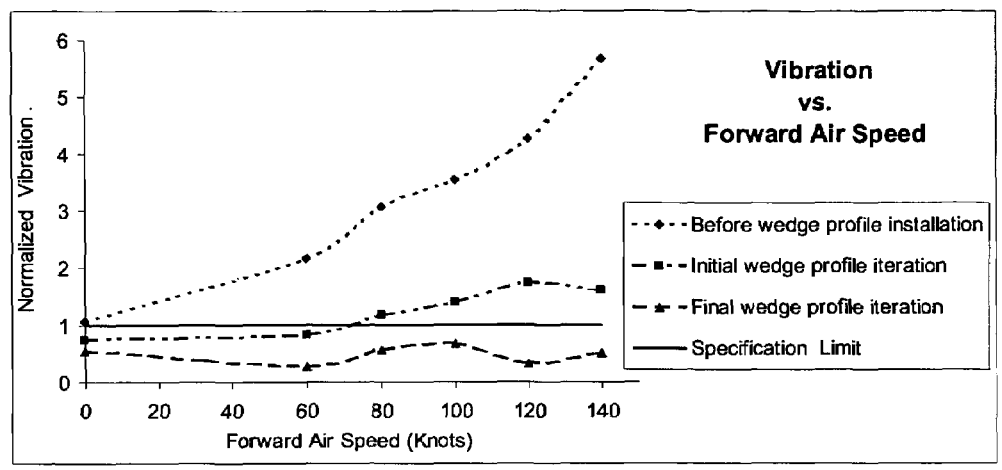
FIG. 3 shows a graph demonstrating the rapid improvements of airframe vibration when the present invention is applied to a rotor blade.

FIG. 3 shows a graphical progression of this process. During an initial flight, airframe vibration measurements indicate that the magnitude of one-per-rotor revolution vertical vibration were above the acceptable limit throughout the range of forward flight speeds. Following this initial in-flight measurement, a rotor smoothing algorithm determined to amount, size and location for the addition of PSA adhering elastomer profile to be applied to specific blades at specific locations on the main rotor. A second flight was performed and new vibration measurements were recorded. Although significantly better, the vertical vibration magnitudes were still above the acceptable limit. The rotor smoothing algorithm determined an additional amount of PSA adhering elastomer profile that was required. In most cases, the quantity of PSA adhering elastomer profiles called for by the rotor smoothing algorithm is significantly less for each progressive iteration. As is illustrated by the example in FIG. 3, acceptable vibration levels were achieved on the second iteration of elastomer profile application. Experience to date has demonstrated that the use of PSA adhering elastomer profile instead of the current state of the art, the bendable metal trim tab, provides a significant reduction in the number of iterations that are required to achieve acceptable airframe vibration level. This is because the addition of a specific length of PSA adhering elastomer profile is a known and repeatable change to the aerodynamic characteristics of the rotor blade. This is not the case with the current state of the art where the amount of bend imparted on a metal trim tab is very hard to accurately measure and control at typical small angle changes.

Figure 4:
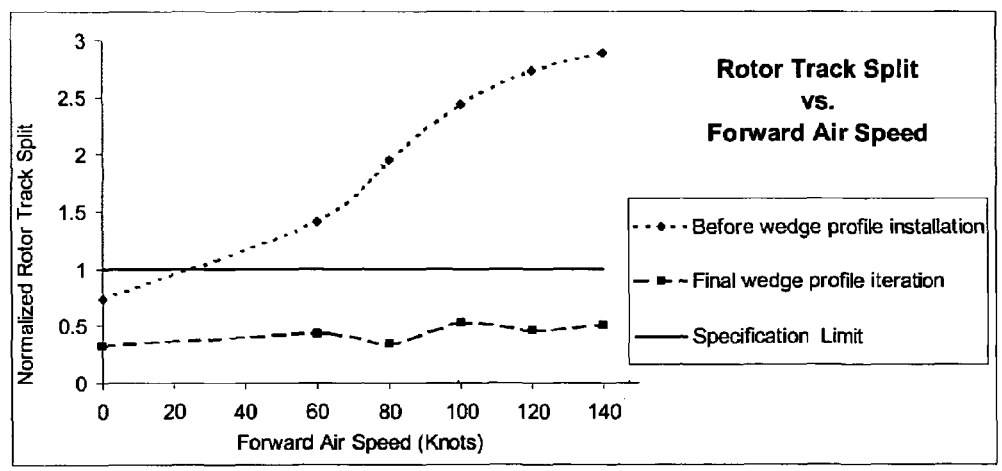
FIG. 4 shows a graph demonstrating the rapid improvements of blade tip tracking when the present invention is applied to a rotor blade.

The most common method of observing the rotor blade tracking pattern during flight is with the use of a strobe light in the cockpit of the helicopter. During flight, the strobe light is focused on the blade tips. The pulsing light frequency is then matched to the rotational frequency of the blades to see the blade tips during various flight conditions, allowing the observation of how well the blades are tracking together. That is, to see if the blade tips are spinning in the same rotational plane. If the blades are marked in a way that is revealed by the pulsing light, the light will also show which blade is tracking out of pattern with the other blade(s). A solution algorithm or profile sensitivity data can then be used to determine the amount, size, and location of PSA adhering elastomer profile to be applied to correct the rotor track condition. More modern systems utilize an automatic on-board optical device that is part of an aircraft system level monitoring system that simultaneously measures airframe vibration. The device can detect the relative position of the tip path for each blade in the rotor system. Recommended solutions for elastomer profile application to correct unacceptable rotor track and vibration are automatically determined by the system. FIG. 4 shows a graphical progression of rotor track improvement after the application of PSA adhering elastomer profiles.

Figure 5A:
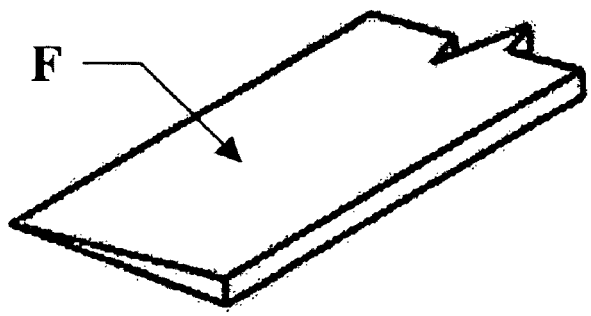
FIGS. 5A-5D show an improved end design for noise reduction.
Figure 5B:
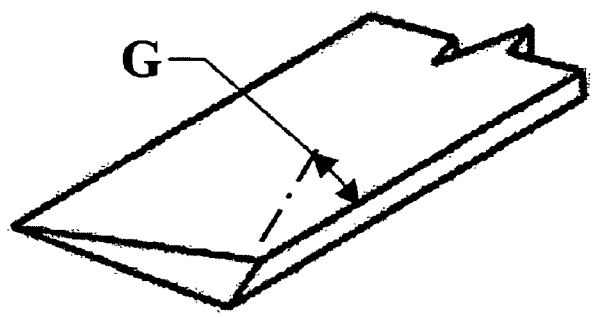
Figure 5C:
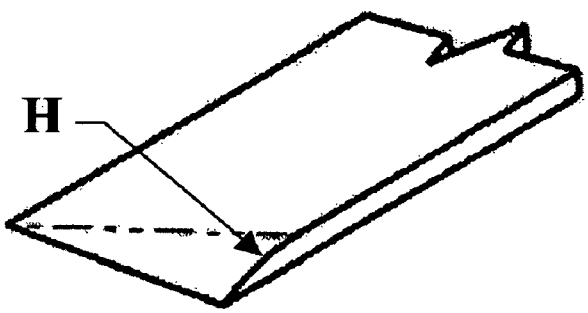
Figure 5D:
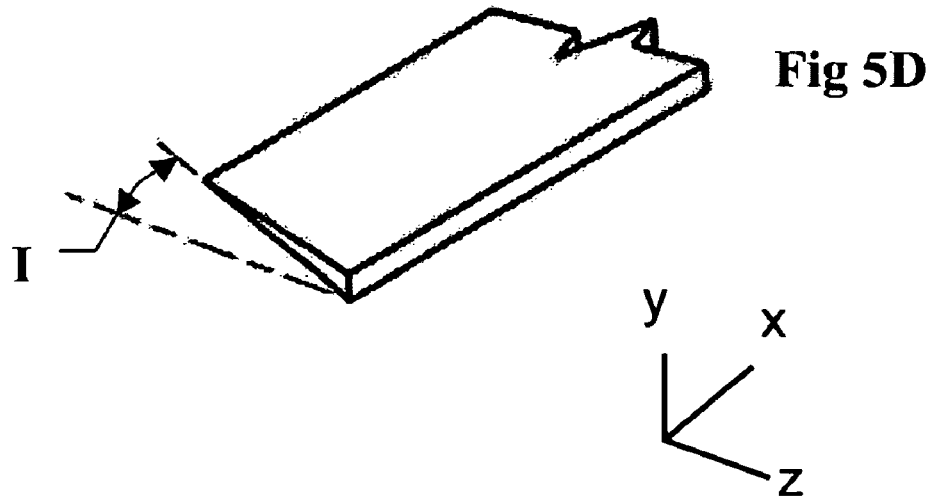

An increase in acoustical noise has been observed with the use of some profile geometries on operational helicopters. The source of this noise has been attributed to the abrupt termination at the ends of the segment length of each installed profile. A modification of the end terminations has been found to reduce or eliminate the increased noise associated with the installation of profiles on a rotating helicopter blade. FIG. 5A shows an abrupt end termination, where the profile terminates with an end surface perpendicular to both the span dimension (i.e. dimension D in FIG. 2A in the x axis direction) and the exterior surface F of the profile. It has been observed during experimentation that this type of profile end termination can create noise when a profile installed on a rotating blade. In embodiments of the present invention, other profile end terminations as shown in FIGS. 5B, 5C, and 5D are utilized to reduce or eliminate noise associated with profile installations without impacting the beneficial effect of the installed profile on a rotating helicopter blade. FIG. 5B shows a profile end termination that has a slant angle G relative to the exterior surface F of the profile. This angle creates a simple blend transition at the ends of the installed profile and reduces the abrupt termination that has been attributed to the creation of noise. The angle is in reference to rotation about a local z axis. FIG. 5C shows a profile end termination that has a smooth radius H that is tangent to the exterior surface F. This end configuration further reduces the abrupt termination that has been attributed to the creation of noise. This radius is relative to a local z axis. FIG. 5D shows a profile end configuration that has an angle I where the end of the profile does not terminate with a surface that is perpendicular to the span dimension of the profile. The angle is in reference to rotation about the local y axis. The geometries shown in FIGS. 5B, 5C, and 5D can be used individually or in combination at one or both ends to reduce or eliminate the noise effect of the installed profile when the rotor is spinning.

Acceptable service life for a helicopter rotors utilizing elastomer profiles according to the teachings of the present invention within the adhesive ranges of 2.8 to 6.6 lb per inch peel strength were demonstrated in the field by testing on a variety of helicopters. Hundreds of hours of flying time were accumulated without incident. None of the elastomer profiles failed or showed signs of significant peeling. The helicopters all flew normally at typical altitudes and speeds in a variety of weather conditions for extended periods of time.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. An elastomer profile useful for reducing airframe vibration and improving blade tracking of a helicopter rotor blade comprising:
   a) an elastomer material,
   b) wherein said elastomer profile substantially comprises said elastomer material,
   c) wherein said elastomer profile is adhered to said helicopter rotor blade by use of a pressure sensitive adhesive,
   d) wherein said helicopter rotor blade is a main lifting rotor blade or a tail rotor blade,
   e) wherein the adherence of said pressure sensitive adhesive to said helicopter rotor blade is peelable by hand,
   f) wherein said elastomer profile is substantially the shape of an elongated wedge,
   g) wherein said elongated wedge has a ramp angle of less than 20 degrees inclusive,
   h) wherein said elongated wedge chord length is less than 20 percent inclusive of the length of the rotor chord dimension,
   i) wherein said elastomer profile is attached to the trailing edge of said helicopter rotor blade with respect to the motion of said helicopter rotor blade, and
   j) wherein said elastomer profile is adjustable by segment length, location, said cord length, said ramp angle, or number as required to correct said airframe vibration and said blade tracking simultaneously to a satisfactory condition according to a predetermined criterion, wherein said predetermined criterion is based on airframe vibration and blade tracking measurements.

2. The elastomer profile according to claim 1 wherein said peelable by hand is an adhesive strength between 2.8 to 6.6 lb per inch inclusive.

3. The elastomer profile according to claim 1 wherein said elastomer profile is oriented so that the trailing edge of said elongated wedge is substantially aligned with the trailing edge of said helicopter rotor blade.

4. The elastomer profile according to claim 1 wherein said elastomer material has a durometer between 10 to 100 inclusive as measured on the Shore A scale.

5. The elastomer profile according to claim 4 wherein said elastomer material has a durometer between 50 to 70 inclusive as measured on the Shore A scale.

6. The elastomer profile according to claim 4 wherein said elastomer material is EPDM.

7. The elastomer profile according to claim 1 wherein said elastomer profile has
   a) a leading edge thickness between 0.005 to 0.010 inches inclusive,
   b) said ramp angle is between 3 to 12 degrees inclusive, and
   c) said elongated wedge chord length is between 2 to 10 percent inclusive of the length of the rotor chord dimension.

8. The elastomer profile according to claim 1 wherein said elastomer profile is part of an assembly, wherein said assembly comprises in order: said elastomer material, said pressure sensitive adhesive which is adhered to a major surface of said elastomer profile, and a removable protective barrier membrane.

9. The elastomer profile according to claim 1 wherein at least one end of said elastomer profile is adapted to reduce noise while said helicopter rotor blade is rotating.

10. The elastomer profile according to claim 9 wherein said adapted end is:
    i) at a non perpendicular angle to the span dimension of said elastomer profile, wherein said non perpendicular angle is based on rotation relative to a first reference axis, wherein said first reference axis is perpendicular to the exterior surface of said elastomer profile,
    ii) at a slant angle relative to the exterior surface of said elastomer profile, wherein said slant angle is based on rotation relative to a second reference axis, wherein said second reference axis is parallel to the exterior surface of said elastomer profile and perpendicular to the span direction of said elastomer profile,
    iii) a radial curve with respect to the exterior surface of said elastomer profile, wherein said radial curve is based on a radius relative to a third reference axis that is parallel to said second reference axis, or
    iv) a combination of at least two of i, ii, and iii above.

11. A wedge detachably attachable to a rotor blade of a helicopter for reducing blade pitching moment dynamic unbalance and aircraft vibrations, said wedge comprising:
    a) said wedge having a length selectable to effectively reduce blade pitching moment dynamic unbalance and aircraft vibrations;
    b) said wedge having a triangular shape in cross-section; and
    c) a peelable pressure sensitive adhesive for detachably attaching said wedge to the rotor blade.

12. The wedge as set forth in claim 11 including a removable protective membrane adjacent said pressure sensitive adhesive.

13. The wedge as set forth in claim 11 wherein said pressure sensitive adhesive is adapted to accommodate detachment by hand of said wedge from the rotor blade.

14. The wedge as set forth in claim 11 wherein said wedge is a truncated triangle in cross section.

15. The wedge as set forth in claim 14 wherein said wedge has a ramp angle of less than 20 degrees.

16. The wedge as set forth in claim 15 wherein the ramp angle is in the range of 3 to 12 degrees.

17. The wedge as set forth in claim 11 wherein the chord of said wedge is less than 20 percent of the chord of the rotor blade to which it is to be attached.

18. The wedge as set forth in claim 11 wherein said wedge is selectively detachably attachable to the main rotor blade or the tail rotor blade of the helicopter.

19. The wedge as set forth in claim 11 wherein said wedge is of elastomer material.

20. A method for reducing airframe vibration and improving blade tracking of a helicopter rotor blade, said method comprising the steps of:
    a) selecting a wedge having a ramp angle of up to 20 degrees from the leading edge to the trailing edge and a bottom surface;
    b) removing a protective membrane from a peelable adhesive disposed at the bottom surface of the wedge;
    c) placing the trailing edge of the wedge at the trailing edge of the rotor blade to extend forwardly therefrom along either the upper or lower surface of the rotor blade; and
    d) manually pressing the wedge on the rotor blade to detachably adhere the wedge to the rotor blade.

21. The method as set forth in claim 20 including the step of manually peeling the wedge from the rotor blade.

* * * * *